US006456373B1

(12) United States Patent
Wienecke et al.

(10) Patent No.: US 6,456,373 B1
(45) Date of Patent: Sep. 24, 2002

(54) METHOD AND APPARATUS FOR MONITORING THE LIGHT EMITTED FROM AN ILLUMINATION APPARATUS FOR AN OPTICAL MEASURING INSTRUMENT

(75) Inventors: Joachim Wienecke, Jena; Kuno Backhaus, Zoellnitz; Detlef Wolter, Jena-Wogau; Matthias Slodowski; Horst-Dieter Jaritz, both of Jena, all of (DE)

(73) Assignee: Leica Microsystems Jena GmbH, Jena (DE)

( * ) Notice: Subject to any disclaimer, the term of this patent is extended or adjusted under 35 U.S.C. 154(b) by 84 days.

(21) Appl. No.: 09/705,931

(22) Filed: Nov. 6, 2000

(30) Foreign Application Priority Data

Nov. 5, 1999 (DE) ........................................ 199 53 290

(51) Int. Cl.[7] .............................. G01J 1/42; G01J 1/10
(52) U.S. Cl. ....................................... 356/218; 356/229
(58) Field of Search ................................ 356/218, 213, 356/227, 229, 230, 231

(56) References Cited

U.S. PATENT DOCUMENTS 3,562,580 A 2/1971 Blomgren et al. ............ 315/88
4,831,564 A 5/1989 Suga .................... 364/551.01
5,495,329 A 2/1996 Anderson, II et al. ...... 356/218

*Primary Examiner*—Michael P. Stafira
(74) *Attorney, Agent, or Firm*—Foley & Lardner

(57) ABSTRACT

In a method for monitoring the measurement light emitted from an illumination apparatus for an optical measuring instrument, a continuous sensing of measurement light parameters is performed. The sensed measurement light parameters are compared to predefined setpoints. Any deviation from the predefined parameter ranges associated with the setpoints is signaled. This signal is used to initiate a lamp exchange on the illumination apparatus, which has multiple lamps that can be selectively switched on and off individually or in groups. Also described is a corresponding illumination apparatus that preferably performs a lamp exchange automatically. The result is to identify a point in time for a lamp change that is optimal with regard to measurement accuracy and the longest possible utilization of the lamps, so that a measurement light quality that remains consistent during continuous operation can reliably be maintained within predefined tolerance ranges.

19 Claims, 3 Drawing Sheets

1
2
3
4
5
6
7
8
9
10
11
12
13
M

METHOD AND APPARATUS FOR MONITORING THE LIGHT EMITTED FROM AN ILLUMINATION APPARATUS FOR AN OPTICAL MEASURING INSTRUMENT

CROSS REFERENCE TO RELATED APPLICATIONS

This invention claims priority of a German patent application DE-199 53 290.7 which is incorporated by reference herein.

FIELD OF THE INVENTION

The invention refers to a method for monitoring the light emitted from an illumination apparatus, and to an apparatus for carrying out said method.

BACKGROUND OF THE INVENTION

Methods and apparatuses of this kind are used wherever, for reasons of accuracy, the values of the light emitted from the illumination apparatus—for example brightness, brightness fluctuations, spectral properties, and the like—must be kept within narrow parameter ranges. This is the case in particular with optical measuring instruments such as those, for example, for layer thickness determination, in which changes in the measurement light caused by a measured specimen are used to draw conclusions as to the properties and/or dimensional consistency of the measured specimen.

Excellent reliability is important in instruments that are used for dimensional consistency inspection in continuous production lines, for example in the manufacture of wafers in semiconductor production, since the measurement results serve as the basis for obtaining information as to product quality and the stability of the production process. This requires stable accuracy in the measuring instrument technology used.

In instruments that operate on optical principles, measurement accuracy always depends to a considerable degree on consistent parameters of the measurement light that is generated in an illumination apparatus. In the lamps usually used for the purpose, however, the properties of the emitted light change with increasing operating life, so that these lamps become unsuitable for measurement purposes because of their age. For economic reasons, however, it is desirable to use the lamps as long as possible without allowing measurement inaccuracy. For safety reasons as well, it is often not desirable to continue using lamps after a maximum permitted operating life has expired.

All that is known in this regard from the existing art is to sense the failure of a lamp and then to perform a lamp replacement. This is described, for example, in U.S. Pat. No. 3,562,580 A, which refers to a projection apparatus.

From U.S. Pat. No. 4,831,564 A it is also known to estimate the remaining lifetime of a xenon lamp on the basis of the present discharge current. What is utilized here is a predefined relationship between discharge current and lifetime, so that on the basis of the instantaneously sensed discharge current, a theoretical remaining operating life can be determined. Since this method allows absolutely no monitoring of the quality of the light emitted by the lamp, it is unsuitable for use in an illumination apparatus for generating measurement light within narrow quality limits.

U.S. Pat. No. 5,495,329 A furthermore refers to an illumination apparatus for a scanner which, upon startup of the scanner, examines the light emitted by a lamp for the presence of various properties, a high degree of consistency in the luminance over a region being scanned being of paramount importance. In addition, based on the time required for the lamp to warm up, information is obtained concerning the aging status thereof, from which predictions can then be obtained regarding the remaining useful life. In this case as well, however, it is impossible to derive reliable information about the quality of the measurement light or an ideal time at which to exchange the lamps.

SUMMARY OF THE INVENTION

It is one object of the invention to create an economical and effective method of making available a measurement light whose properties remain consistent over long periods of time.

This object is achieved by a method which comprises the following steps:

- switching on and off multiple lamps of the illumination apparatus wherein the switching is carried out individually for each lamp or in groups of lamps;
- sensing of lamp parameters and/or measurement light parameters;
- comparing the sensed parameters with predefined setpoints referred thereto;
- signaling a deviation in one or more of the sensed parameters from the predefined setpoints beyond a specific tolerance; and
- exchanging the lamp or lamp group thereupon.

A further object of the invention is to provide an apparatus for an optical measuring instrument, in particular a layer thickness measuring instrument wherein the apparatus provides contant illumination properties for a long period of time. Moreover, the downtime of the a layer thickness measuring instrument should be reduced.

The above object is achieved by an apparatus which comprises:

- multiple lamps defining a measurement light source, of which at least one is provided for performing a measurement task while the others serve as reserve lamps;
- an operating voltage source that can be switched on and off and is connected via contacts to the at least one lamp defining the measurement light source;
- an activatable device for selectably conveying at least one lamp to the contacts;
- a device for sensing lamp parameters and/or measurement light parameters;
- a device for specifying setpoints associated with the respective parameters;
- a comparison device that, in the event that one or more of the sensed measurement light parameters deviate from corresponding setpoints, generates a signal representing the deviation and
- an activation circuit receiving said signal and the activation circuit is connected to the activatable device.

It is thereby possible to determine the optimum point in time for a lamp exchange that allows a compromise between the maximum lamp lifetime and the measurement light quality necessary for a measuring instrument. The continuous sensing of lamp parameters and/or measurement light parameters, preferably of those parameters that are also read out in the optical instrument, can be performed during a measurement operation itself, so that if necessary a lamp exchange can be authorized immediately, thus guaranteeing high availability of a measurement light within the desired tolerance range.

This is critically significant specifically for production lines with a high throughput, in order to minimize production wastage. In an advantageous embodiment of the invention, the brightness or intensity of the measurement light, the frequency with which brightness or intensity fluctuations occur, and its spectral distribution, are sensed as the measurement light parameters. The method is thus suitable especially for an illumination apparatus that is used in conjunction with spectroscopic measurement methods, for example an optical layer thickness measurement.

The lamp life of lamps used in illumination devices, for example halogen lamps, xenon lamps, or deuterium lamps, is time-limited because of their design. For the aforementioned lamps, lifetimes guaranteed by the manufacturer are in the range of 1000 hours and above. In a further advantageous embodiment of the invention in this context, in order to guarantee a high degree of uniformity in the measurement light, the lamp life of each lamp is added up and the fact that a predefined lamp life has been reached is signaled, whereupon an exchange of the lamp or of a lamp group is performed.

This makes it possible, in particular, to protect against the risk of explosion, which increases toward the end of the lamp's lifetime. Leaving this aside, it is further advantageous also to monitor the illumination apparatus for total failure of a lamp and to signal any such failure, so as thereupon immediately to initiate an exchange of the defective lamp or lamp group.

To simplify the monitoring regime, checking for total failure of a lamp or lamp group, and/or checking the lamp life, can be accomplished with a photodetector close to the lamp, so that malfunction information can be arrived at with particularly high reliability. The monitoring outlay for the aforesaid criteria moreover remains low. Also possible is a process-engineering decoupling of malfunction messages resulting from measurement light parameter deviations. It is also conceivable to monitor the lamp current so that a total failure can be identified.

In a further advantageous embodiment of the method according to the present invention, after a measurement light parameter deviation has been signaled, a check measurement is performed so that impairments of the measurement light that are not caused by the lamps can be identified and if applicable eliminated. This avoids uneconomical premature lamp exchanging. For the check measurement, first a calibration is performed on the optical measuring instrument using the optical measurement assemblies that are present in any case. An exchange of the lamp or lamp group is performed only if a deviation from the predefined parameter ranges continues to be signaled even after calibration.

The calibration is preferably accomplished on the basis of the comparison of a known spectrum of a reference body that is stored, for example, in a data processing apparatus, to a measurement light spectrum influenced by the reference body. This procedure is suitable in particular for a layer thickness measurement instrument, for example a spectrophotometer or spectroellipsometer, in which the aforementioned calibration can be performed with little effort, optionally even automatically.

In a further advantageous embodiment, alternatively or in addition to the aforementioned calibration operation a further check measurement is performed in which the optical measuring instrument is calibrated with a reference body of known layer thickness, by the fact that the layer thickness value derived from the influence on the measurement light is compared to the known layer thickness of the reference body. Only if the deviation in measurement light parameters from the predefined parameter ranges continues to exist is an exchange of the lamp or lamp groups then initiated. Otherwise the lamps or lamp groups presently in operation can continue to be used, so that the aforesaid procedure prevents any unnecessary early exchange of the lamps but also guarantees a high level of uniformity in the measurement light at the measurement point, and consequently excellent measurement accuracy in the optical measuring instrument.

In order to limit process complexity and arrive at a particular simple procedure for performing the measurement light monitoring, the sensing of lamp parameters and/or measurement light parameters is accomplished simultaneously or alternatingly with the performance of the measurement task for which the optical measuring instrument is configured, at least one of the assemblies that serves to perform the measurement task also being used to sense or monitor the lamp parameters and/or measurement light parameters.

In a further advantageous embodiment of the method, exchanging of the lamp or lamp groups is accomplished automatically. The illumination apparatus is thus suitable in particular for use in continuously operated measuring instruments that are utilized, for example, in a series production line. The lamp exchange necessary in order to maintain a high measurement light quality can then be performed, if applicable, completely without the intervention of operating personnel. thus resulting in no, or in any case minimal, delays in the production sequence. The time needed to exchange the lamps can thereby also be minimized.

The object upon which the invention is based is furthermore achieved with an illumination apparatus for an optical measuring instrument, in particular for a layer thickness measuring instrument, comprising multiple lamps serving as a measurement light source, of which at least one is provided for performing the next measurement task while the others serve as reserve lamps; an operating voltage source that can be switched on and off and is connected via contacts to the at least one lamp serving as the measurement light source; an activatable device for selectably conveying the lamps to the contacts; devices for continuous and/or intermittent sensing of lamp parameters and/or measurement light parameters; devices for specifying setpoints associated with the respective parameters; and a comparison device that, in the event that one or more of the sensed measurement light parameters deviates from the corresponding setpoints, generates a signal representing the deviation and forwards that signal to an activation circuit that is connected to the conveying device.

The advantages attained are those already described in conjunction with the method according to the present invention.

In an advantageous embodiment of this illumination apparatus, the conveying device is configured as a rotatable drum on whose circumference the lamps are arranged at radially symmetrical intervals; the contacts are in radial engagement with at least one of these lamps; and the drum is coupled to a drive that, as a function of a positioning signal, causes the drum to rotate until the lamp in engagement with the contacts has been exchanged.

This manner of achieving the object makes possible a particularly compact design for a lamp changer, on which a large number of lamps or lamp groups can be provided so that at the end of the operating life of a lamp or lamp group, the drum simply needs to be switched from one position into the next with no need to insert or remove lamps. Only when all the lamps have been exhausted is it necessary to repopulate the drum with lamps.

The radially external arrangement of the electrical contacts of the individual lamps or lamp groups moreover makes possible a considerable simplification in power delivery, which can be accomplished via a single connector apparatus.

To simplify lamp exchange by way of a rotation of the drum, the electrical connector device is configured to be movable radially back and forth with respect to the rotation axis, so that damage to the electrical contacts, especially on the electrical connector device, during an exchange operation is reliably prevented.

BRIEF DESCRIPTION OF THE DRAWINGS

The invention will be explained below in more detail with reference to an exemplary embodiment. In that context, in the associated drawings.

DETAILED DESCRIPTION OF THE INVENTION

Figure 1:
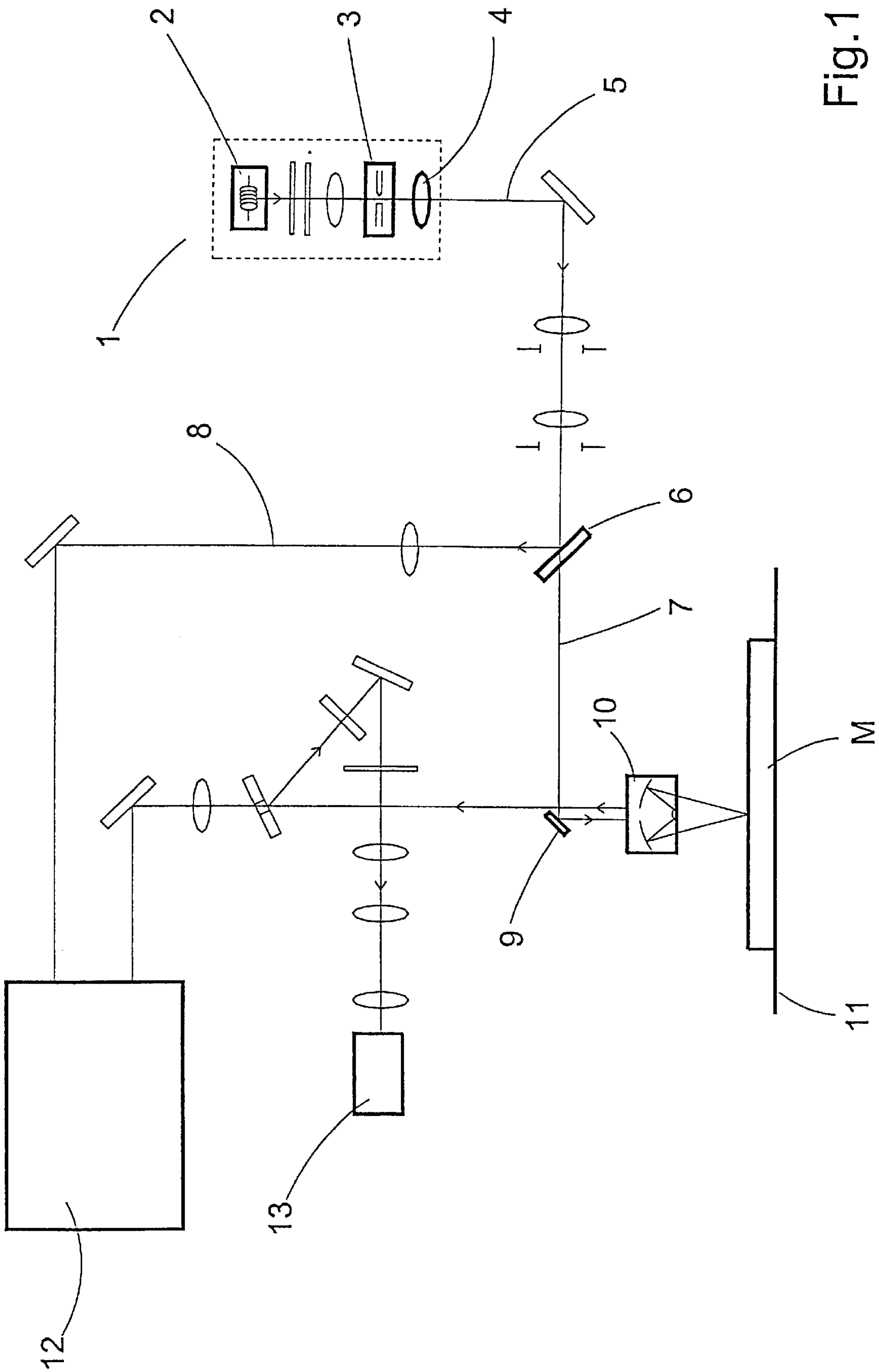
FIG. 1 shows a schematic depiction of a layer thickness measuring instrument based on the principle of spectrophotometry, having an illumination apparatus according to the invention.

The invention will be explained below by way of the example of an optical layer thickness measuring instrument that can be used in a production line for semiconductor fabrication, where the wafers produced therein are to be checked. The corresponding device is depicted schematically in FIG. 1.

This device comprises an illumination apparatus 1 in which is provided a halogen lamp 2 whose filament is imaged in the opening of a deuterium lamp 3 that is also part of illumination apparatus 1. The light produced by these two lamps, which is optionally filtered, is concentrated with suitable lenses 4 into an illumination beam 5.

Illumination beam 5 passes, via mirrors, lenses, and stops whose arrangement in such instances is common knowledge to one skilled in the art and therefore need not be explained further here, to a beam splitter 6, for example a semitransparent mirror, and is split there into a measurement beam 7 and a reference beam 8.

Reference beam 8 is conveyed, again with the aid of suitably arranged optical assemblies such as mirrors and lenses, to an investigative apparatus, for example in this case a spectrophotometer 12. Measurement beam 7, on the other hand, after a change in direction by way of deflection mirror 9, is directed through a mirror objective 10 onto a measured specimen M, in this case a wafer, that rests on a measurement stage 11.

Measurement beam 7 illuminates a target area of measured specimen M arranged on measurement stage 11. The measurement light thereby reflected from measured specimen M into mirror objective 10 is then also delivered to spectrophotometer 12, where the measurement light and reference light are spectrally dispersed for evaluation, and at the same time imaged on a CCD matrix. The methods of spectrophotometry are sufficiently well known that any explanation thereof at this juncture is also superfluous.

Also provided is a CCD camera 13 with which the measurement area being investigated can be displayed on a monitor, so as thereby to allow the selection of a portion on measured specimen M for examination.

In spectrophotometer 12, following comparison with the reference signal, the measurement signals deriving from the specimen image are standardized, thus reducing the influence of any lamp noise and compensating for the influence of the lamps on the spectrum.

Since the process of monitoring illumination apparatus 1 or monitoring the measurement light emitted from illumination apparatus 1 (to be explained later) is based on a calibration of the optical measuring instrument, this calibration will be briefly explained here with reference to FIG. 1.

It is known that the light available for evaluation in spectrophotometer 12 is influenced not only by measured specimen M but also by many other factors, which are also embodied in its spectrum and are undesired and therefore constitute interference. Such interference factors include, for example, energy losses, the spectral transparency of the optical elements used, the spectral sensitivity of the receiving sensors, and the like.

In order then to make possible a reliable conclusion as to the layer thickness on specimen M, it is necessary to exclude, to the greatest extent possible, the influence of these factors or to compensate for errors resulting therefrom. In the layer thickness measuring instrument depicted in FIG. 1, a measurement is therefore first made using a reference body whose spectral distribution $N(\lambda)$ is known. For that purpose, the reference body is illuminated with measurement beam 7, the spectral distribution of the light reflected from the reference body is sensed, and the result is stored and made available for the remainder of the measurement process. By comparison to the known spectral distribution $N(\lambda)$, it is possible to compensate in particular for the interference factors that are present in the transmission path from beam splitter 6 to spectrophotometer 12.

The reference body having the known spectral distribution $N(\lambda)$ is available at any time for a quick check, and for that purpose is stored on measurement stage 11 at a predetermined location. Because changes in the equipment resulting from environmental influences make periodic calibration necessary, such calibration is performed approximately every twenty-four hours when the system is in continuous operation.

Since, however, as already explained earlier, the emission behavior of the lamps and thus the parameters of the illumination light continue to change over time, a continuous comparison between the measurement light delivered to spectrophotometer 12 and the reference light is performed.

For this purpose a further calibration of spectrophotometer 12 is performed, preferably at weekly intervals, using a further reference body that has a known layer thickness.

Figure 3:
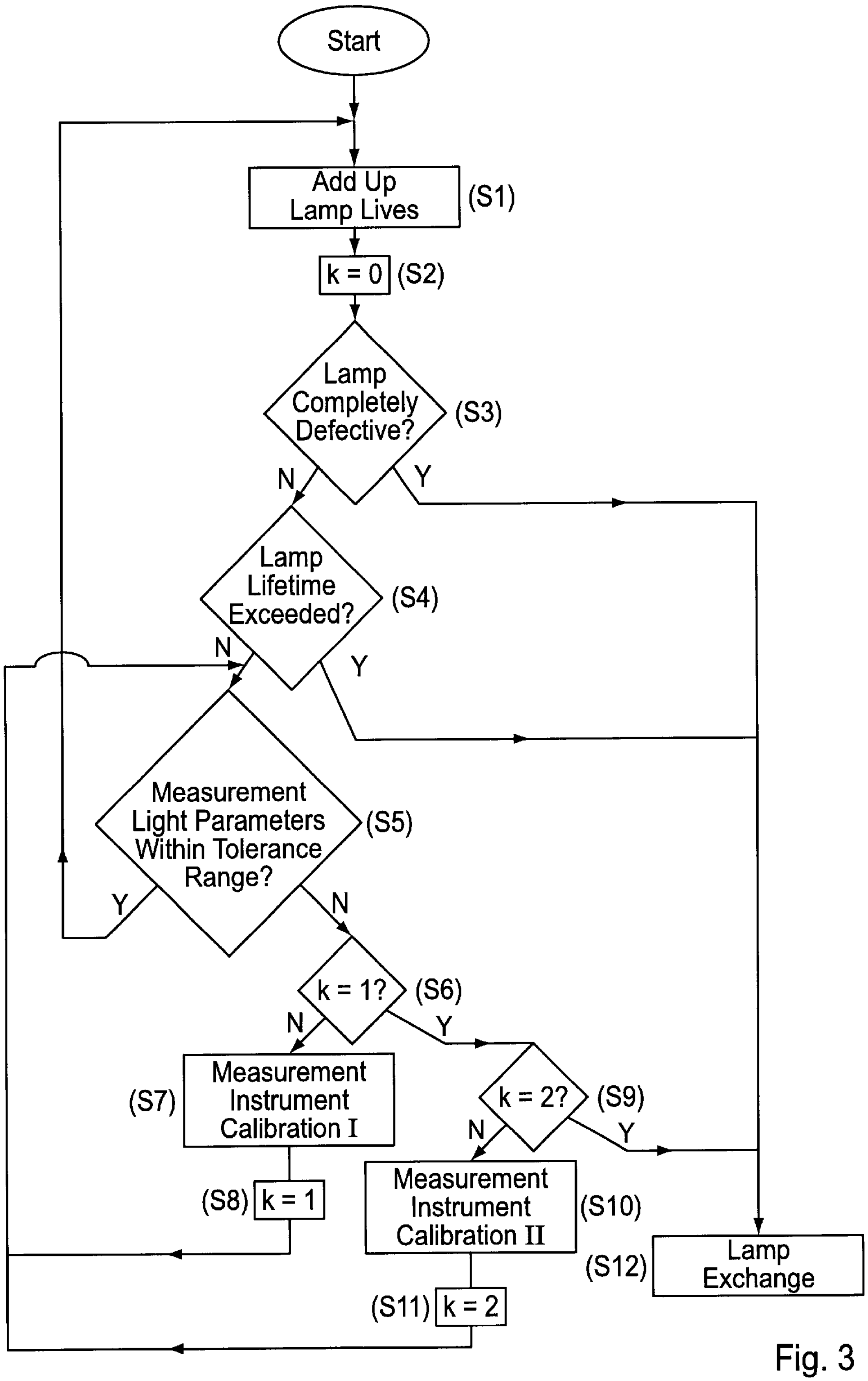
FIG. 3 shows a flow chart for monitoring the measurement light of an illumination apparatus for an optical measuring instrument.

The sequence of the individual steps for monitoring illumination apparatus 1 corresponds in principle to the reverse of the calibration sequence. A flow chart of one such measurement light monitoring process is depicted in FIG. 3.

It is evident from this that after activation of illumination apparatus 1, or of the lamps used, recording and summing of the operating life of the lamps begins, the previously attained value being buffered if illumination apparatus 1 is temporarily switched off.

The monitoring program runs in the background as an endless loop during operation of the measuring instrument. As is evident from FIG. 3, in a first step S3 a lamp failure check is made. If such failure is detected, a signal is immediately generated that requests a lamp exchange or, in the case of an automatic lamp exchange apparatus, immediately initiates such exchange. If illumination of the lamp is detected, however, then in a further step S4 a check is made regarding the lifetime of the lamp that is defined in the flow chart. It is advantageous in this context, for safety reasons, to proceed from the lifetime guaranteed by the manufacturer, which is usually less than an average lifetime or the maximum lifetime, and is approximately 1000 hours for a xenon lamp or deuterium lamp, and approximately 2000 hours for halogen lamps. If it is found, upon adding up the lamp life in step S1, that the predefined service life has been reached, then once again a signal is generated on the basis of which a lamp exchange S12 is initiated.

If the predefined lamp life has not yet been exceeded, a check is made of the illumination light in terms of selected parameters, determining whether they lie within a tolerance range that is adequate for measurement quality (S5).

In the exemplary embodiment depicted, the brightness or intensity, the spectral distribution, and the frequency with which brightness or intensity fluctuations occur, are sensed for this purpose. If they lie within the permitted range, the program branches back to step S1. If, on the other hand, deviations from the permitted tolerance range are detected, then in a further step S7 firstly another calibration of the optical measuring instrument is performed using the reference body with a known spectral distribution, to ascertain whether the deviations are caused by the aging process in the lamps or derive from other causes, for example changes in the measuring instrument.

The calibration is followed by another check of the measurement light parameters. If these are once again in the permitted range once calibration has been performed, the lamps previously in service continue to be used. If, on the other hand, a deviation from the permitted measurement light parameter ranges is once again detected, a further calibration procedure S10 is accomplished. Setting the counters in steps S2, S8, and S11, and interrogating these counters in steps S6 and S9, ensures that after the calibrations in steps S7 and S10, if the measurement light parameter deviations persist, the program does not get into an endless loop but rather ultimately a lamp exchange S12 is initiated.

The program described above ensures on the one hand that narrow tolerance ranges for the measurement light parameters around predefined setpoints can be maintained, and on the other hand that the lamps in use can be utilized long enough that the optimum point in time for a lamp change can thereby be found.

The lamp exchange can in principle be performed in any manner. With an eye to efficient series production, however, the exchange time should be kept as short as possible. In a particularly favorable variant embodiment, lamp exchange is therefore accomplished automatically, by the fact that a mount receiving multiple lamps, whose lamps can be operated individually or in groups, is switched from a position in which specific lamps are connected to the operating voltage into another switch position in which other lamps of identical design are operating.

Figure 2:
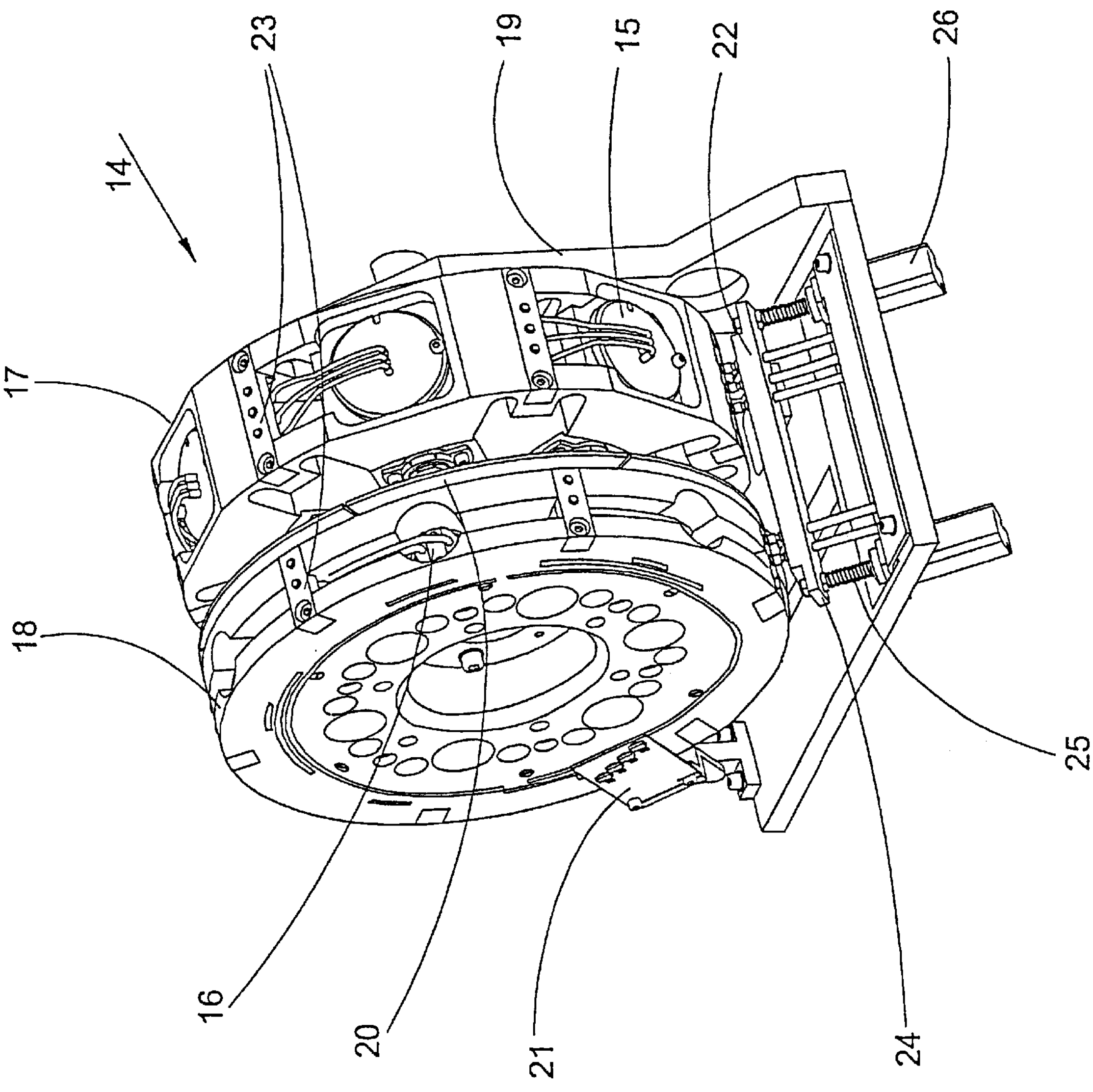
FIG. 2 shows a perspective view of a lamp changer of the illumination apparatus.

In the exemplary embodiment, lamp changer 14 depicted in FIG. 2 is used for this purpose. It is designed for six deuterium lamps 15 and six halogen lamps 16, arranged respectively next to one another in drums 17 and 18 and distributed at equal intervals in the circumferential direction. These two drums 17, 18 are connected to one another and arranged rotatably about a common axis.

Advantageously, heat protection filters and/or neutral density filters (not depicted in the drawing) are located between the lamps. Also provided are optical devices that allow the filament of the respective halogen lamp 16 to be imaged in the pinhole of deuterium lamp 15 (see explanation of FIG. 1).

Drums 17, 18 are driven by way of a drive motor (not depicted) with respect to a stationary housing part 19. The transfer of rotary motion from the output shaft of the motor to drums 17, 18 is preferably accomplished via a toothed-belt drive, although a switchable mechanical decoupler is provided in order to allow precise positioning of drums 17, 18 in the circumferential direction. This can be brought about, for example, by a click-stop system using a click-stop ring and suitably arranged springs, to ensure that the lamps selected for operation are located in a precisely defined position.

As further indicated in FIG. 2, an evaluation of the position of the lamps is performed via a coding disk 20 and an associated fork coupler. A particular position code that corresponds to a specific lamp pair is detected, for example, by way of tracks arranged on drum 18 that come into engagement, in the operating position, with a reflection coupler 21 arranged in stationary fashion on the housing. This makes possible an unequivocal determination of the position of all the lamp pairs that are present.

In order to simplify the electrical circuitry for delivering operating voltage to the lamps, and to eliminate a multiple-strand cable bundle, there is provided on the housing side an electrical connector device 22 to which the particular lamps that are in the operating position are connected. For that purpose, drums 17, 18 are each equipped on their radial exterior with electrical terminals for the relevant lamps or lamp groups, lamp pairs being used in the selected exemplary embodiment.

The electrical terminals are located substantially parallel [to] contact strips 23, extending parallel to the rotation axis, from which an electrical connection to the individual lamps of a lamp group is then made. These contact strips 23 come into engagement with a contact counterstrip 24, radially movable with respect to drums 17, 18, of electrical connector device 22. In an operating position, the latter is pressed by springs 25 against one of the drum-mounted contact strips 23.

To make a lamp exchange possible, actuation members 26 are also provided on electrical connector device 22 in order to allow contact counterstrip 24 to be temporarily pulled back from drums 17, 18. In the exemplary embodiment selected, two pneumatic cylinders are used for this purpose; instead of them, hydraulic or electromagnetic devices can also be used to pull back the movable contact counterstrip 24.

A lamp exchange is performed whenever a corresponding signal is triggered, for example when a lamp is burned out, the permitted service life has been reached, or the necessary measurement light parameters can no longer be kept within the desired tolerance limits even after a recalibration.

For that purpose, first of all contact counterstrip 24 is pulled back from electrical connector device 22 so that drums 17, 18 can be rotated freely about their longitudinal axis until a new lamp pair clicks into place in the operating position. By way of actuation members 26, contact counterstrip 24 is then pressed via springs 25 against the drum-mounted contact strip 23 of the new lamps which is located, because of the click-stop system, in the correct position. Only when all the lamp pairs located on lamp changer 14 are exhausted is the entire assembly replaced.

After a lamp exchange has been completed, first of all a recalibration is performed in the manner described above. If the predefined tolerance ranges of the measurement light parameters cannot be achieved with the new lamps, another lamp exchange can be initiated immediately. The lamp exchange is optimized using a logic circuit that determines the shortest positioning travel taking into account the rotation direction of drums 17, 18. Shortly before the operating position for the new lamps is reached, the rotation speed is reduced in order to ensure a stable approach into the operating position. Once again, reflection coupler 21 and coding disk 20 can be used for this purpose.

In a specific embodiment, drums 17 and 18 are driven separately from one another so that in the event of failure of a lamp on the one drum, the lamp currently in operation on the other drum can continue to be used. In a further special variant embodiment, lamp changer 14 is configured with a single drum, which can be configured to correspond to drum 17 or 18 and is fitted, for example, with xenon lamps.

To evaluate lamp function, an optical sensor is mounted, for example separately for each lamp type, on the corresponding drum or also in the immediate vicinity of the housing of the illumination apparatus surrounding it, and supplies a "lamp lit" signal taking into account a defined threshold value. This signal controls an operating hour counter which performs the recording of lamp operating time depicted in step S1 of FIG. 3.

In the event of a total failure or one or all lamps, a lamp exchange is initiated immediately and automatically. The measurement job currently in progress can then be easily continued at the point of interruption. When the maximum lifetime of the lamp is reached, or if a deviation from the tolerance ranges of the measurement light parameters is identified in step S5, the automatic lamp exchange is organized by a software module in such a way that the lamp exchange is postponed until the system is in a waiting state. An operator is informed of the impending lamp exchange or the fact that a calibration needs to be performed, and can influence the specific time at which the exchange occurs.

PARTS LIST

1 Illumination apparatus
2 Halogen lamp
3 Deuterium lamp
4 Lenses
5 Illumination beam
6 Beam splitter
7 Measurement beam
8 Reference beam
9 Deflection mirror
10 Mirror objective
11 Measurement stage
12 Spectrophotometer
13 CCD camera
14 Lamp changer
15 Deuterium lamp
16 Halogen lamp
17, 18 Drums
19 Housing part
20 Coding disk
21 Reflection coupler
22 Connector device
23, 24 Contact strips
25 Springs
26 Actuation members
M Measured specimen

What is claimed is:

1. A method for monitoring the light emitted from an illumination apparatus for an optical measuring instrument, comprising the steps of:

switching on and off multiple lamps of the illumination apparatus wherein the switching is carried out individually for each lamp or in groups of lamps;

sensing of lamp parameters and/or measurement light parameters;

comparing the sensed parameters with predefined setpoints referred thereto;

signaling a deviation in one or more of the sensed parameters from the predefined setpoints beyond a specific tolerance; and exchanging the lamp or lamp group thereupon.

2. The method as defined in claim 1 wherein the sensing of the lamp parameters is done continuous and intermittent.

3. The method as defined in claim 1 wherein the sensing of the lamp parameters is done continuous.

4. The method as defined in claim 1 wherein the sensing of the lamp parameters is done intermittent.

5. The method as defined in claim 1, characterized in that the brightness of the measurement light, its spectral distribution, and the frequency with which brightness fluctuations occur, are sensed as the measurement light parameters.

6. The method as defined in claim 1, comprising the steps of:

adding up the lamp life of the respective lamps; and signaling the fact that a predefined lamp life has been reached, whereupon an exchange of the lamp or lamp groups is performed.

7. The method as defined in claim 1, comprising the steps of:

continuously monitoring the illumination apparatus for failure of a lamp; and signaling the occurrence of a lamp failure, whereupon an exchange of the defective lamp or lamp group is performed.

8. The method as defined in claim 1, comprising the steps of:

perfoming a check measurement after a measurement light parameter deviation has been signaled, for which first a calibration is accomplished on the optical measuring instrument; and exchanging of the lamp or lamps is performed only if an impermissible deviation from one or more setpoints continues to be signaled after calibration.

9. The method as defined in claim 8, characterized in that during the calibration operation, a comparison is made of an inherently known spectrum of a reference body to a measurement light spectrum influenced by the reference body, and an exchange of the lamp or lamp group is performed only if an impermissible deviation from one or more setpoints continues to be signaled.

10. The method as defined in claim 8, characterized in that calibration is accomplished with a reference body of known layer thickness, by the fact that the layer thickness value derived from the influence by the measurement light is compared to the known layer thickness, and only if an impermissible deviation continues to exist is an exchange of the lamp or lamp group then initiated.

11. The method as defined in claim 1, characterized in that the sensing of lamp parameters and/or measurement light parameters is accomplished simultaneously or alternatingly with the performance of the measurement task for which the optical measuring instrument is configured, at least one of the assemblies that serves to perform the measurement task also being used to monitor and sense the lamp parameters and/or measurement light parameters.

12. The method as defined in claim 1, characterized in that any necessary exchange of the lamp or lamp group is performed automatically without manual intervention.

13. The method as defined in claim 3, characterized in that sensing of lamp parameters and/or measurement light parameters, is performed with a photodetector close to the lamp.

14. An illumination apparatus for an optical measuring instrument, in particular a layer thickness measuring instrument, comprising:

multiple lamps defining a measurement light source, of which at least one is provided for performing a measurement task while the others serve as reserve lamps;

an operating voltage source that can be switched on and off and is connected via contacts to the at least one lamp defining the measurement light source;

an activatable device for selectably conveying at least one lamp to the contacts;

a device for sensing lamp parameters and/or measurement light parameters;

a device for specifying setpoints associated with the respective parameters;

a comparison device that, in the event that one or more of the sensed measurement light parameters deviate from corresponding setpoints, generates a signal representing the deviation and an activation circuit receiving said signal and the activation circuit is connected to the activatable device.

15. The illumination apparatus as defined in claim 14, characterized in that the device for sensing senses the lamp parameters and/or measurement light parameters continuously and intermittently.

16. The illumination apparatus as defined in claim 14, characterized in that the device for sensing senses the lamp parameters and/or measurement light parameters continuously.

17. The illumination apparatus as defined in claim 14, characterized in that the device for sensing senses the lamp parameters and/or measurement light parameters intermittently.

18. The illumination apparatus as defined in claim 14, characterized in that the activatable device is equipped with a rotatable lamp carrier that comprises at least one drum (17, 18) on whose circumference the lamps (15, 16) are arranged at radially symmetrical intervals; the contacts are in radial engagement with at least one of these lamps; and each drum (17, 18) is coupled to a drive that, as a function of a positioning signal, causes it to rotate until the lamp (15, 16) in engagement with the contacts has been exchanged.

19. The apparatus as defined in claim 18, characterized in that the contacts are arranged on drum-mounted contact strips (23) on the one hand and frame-mounted contact strips (24) on the other hand, and the frame-mounted contact strips (24) are coupled to actuation members (26).

* * * * *